United States Patent [19]

Rekers et al.

[11] 4,184,028
[45] Jan. 15, 1980

[54] OLEFIN POLYMERIZATION CATALYST

[75] Inventors: Louis J. Rekers, Wyoming; Stanley J. Katzen; Jerome H. Krekeler, both of Cincinnati, all of Ohio

[73] Assignee: National Petro Chemicals Corporation, New York, N.Y.

[21] Appl. No.: 811,003

[22] Filed: Jun. 29, 1977

Related U.S. Application Data

[60] Division of Ser. No. 724,484, Sep. 20, 1976, which is a continuation-in-part of Ser. No. 558,504, Mar. 14, 1975, Pat. No. 3,984,351.

[51] Int. Cl.$^2$ ............................ C08F 4/24; C08F 4/62; C08F 10/00
[52] U.S. Cl. ................................ 526/105; 526/129; 526/139; 526/156; 526/161; 526/172; 526/352
[58] Field of Search ............... 526/100, 105, 129, 139, 526/156, 161, 172

[56] References Cited

U.S. PATENT DOCUMENTS

| | | | |
|---|---|---|---|
| 3,474,080 | 10/1969 | Rekers et al. | 526/161 |
| 3,704,287 | 11/1972 | Johnson | 526/129 |
| 3,901,825 | 8/1976 | Meyer et al. | 526/129 |
| 3,969,272 | 7/1976 | Meyer | 526/161 |
| 3,984,351 | 10/1976 | Rekers et al. | 526/129 |
| 3,985,676 | 10/1976 | Rekers et al. | 526/129 |
| 4,008,359 | 2/1977 | Meyer et al. | 526/129 |
| 4,049,896 | 9/1977 | Rekers et al. | 526/129 |

*Primary Examiner*—Alan Holler
*Attorney, Agent, or Firm*—Kenneth D. Tremain

[57] ABSTRACT

Olefin polymerization catalysts are prepared by depositing an organophosphoryl chromium product and an aluminum compound on an inorganic support material, and heating the support material in a non-reducing atmosphere at a temperature above about 300° C. up to the decomposition temperature of the support material.

7 Claims, No Drawings

OLEFIN POLYMERIZATION CATALYST

This is a division of application Ser. No. 724,484, filed Sept. 20, 1976, which is a continuation-in-part of copending application Ser. No. 558,504, filed Mar. 14, 1975 now U.S. Pat. No. 3,984,351.

BACKGROUND OF THE INVENTION

The use of chromium compounds in the polymerization of olefins is well-known. U.S. Pat. Nos. 2,825,721 and 2,951,816 teach the use of $CrO_3$ supported on an inorganic material such as silica, alumina or combinations of silica and alumina and activated by heating at elevated temperatures to polymerize olefins. When these catalyst systems are used in various polymerization processes such as the well-known particle-form process, the resins produced, while useful in many applications, are unsatisfactory for others because of a deficiency in certain properties such as melt index.

Attempts to improve deficient properties of polyolefins produced using supported, heat-activated chromium oxide catalysts have been made by adding various metal and non-metal compounds to the supported chromium oxide prior to activation by heating. For example, in U.S. Pat. No. 3,622,522 it is suggested that an alkoxide of gallium or tin be added to supported chromium oxide prior to heat activation. U.S. Pat. No. 3,715,321 suggests adding a compound of a Group II-A or Group III-B metal to supported chromium oxide prior to heat treatment whereas U.S. Pat. No. 3,780,011 discloses adding alkyl esters of titanium, vanadium or boron and U.S. Pat. No. 3,484,428 discloses adding alkyl boron compounds.

In columns 5 and 6 and Table 1 of U.S. Pat. No. 3,622,522 the addition of aluminum isopropoxide to supported chromium oxide prior to heat activation is shown for purposes of comparison with the addition of an alkoxide of gallium or tin. The patentee concluded that the addition of the aluminum compound gave substantially the same or an increased HLMI/MI ratio of polymers produced as compares to the chromium oxide catalyst with no metal alkoxide added, whereas the addition of gallium or tin alkoxides produced polymers having a lower HLMI/MI ratio.

It is also known to utilize other chromium compounds as catalysts for the polymerization of olefins. Such compounds include various silyl chromate and polyalicyclic chromate esters as described, for example, in U.S. Pat. Nos. 3,324,095; 3,324,101; 3,642,749; and 3,704,287. The use of phosphorus-containing chromate esters in olefin polymerization catalysts has also been disclosed in the aforesaid U.S. Pat. No. 3,704,287; and in U.S. Pat. No. 3,474,080 and copending application Ser. No. 532,131, filed Dec. 16, 1974 now U.S. Pat. No. 3,985,676.

Use of the above chromium compound catalysts in Ziegler-type coordination catalyst systems has also been proposed. As is well-known in the art, such catalysts frequently additionally comprise organometallic reducing agents such as, for example, trialkyl aluminum compounds. Ziegler-type catalyst systems incorporating supported chromium compound catalysts and organometallic reducing agents, particularly organoaluminum compounds, are disclosed, for example, in U.S. Pat. Nos. 3,324,101; 3,642,749; 3,704,287; 3,806,500; and in the aforesaid copending application Ser. No. 532,131.

SUMMARY OF THE INVENTION

It has been discovered in accordance herewith that olefin polymers, of suitable properties e.g. melt indexes and melt index ratios, may be secured at acceptable productivity levels by utilization of an olefin polymerization catalyst system prepared by depositing an organophosphoryl chromium product and an aluminum compound on an inorganic support material and heating the supported chromium containing product and aluminum compound at a temperature above 300° C. up to the decomposition temperature of the support. The heat treated, supported chromium containing product and aluminum compound may be employed directly as an olefin polymerization catalyst. Polymers produced using the novel catalyst systems of the present invention have desirable flow properties and shear response.

DETAILED DESCRIPTION OF THE INVENTION

The novel catalyst systems of the present invention are prepared by depositing, on an inorganic support material having surface hydroxyl groups, an aluminum compound capable of reacting with the surface hydroxyl groups of the support material and an organophosphoryl chromium product. The supported chromium containing product and aluminum compound are then heated in a non-reducing atmosphere at a temperature above about 300° C. up to the decomposition temperature of the support material.

It is believed that the chromium containing product and the aluminum compound may react with the surface hydroxyl groups on the inorganic support material during the course of preparing the novel catalyst systems of the present invention. However, the precise mechanism involved is not known and applicants do not wish to be restricted to the mechanism postulated above.

The inorganic support materials useful in the present invention include those normally employed in supported chromium catalysts used in olefin polymerizations such as those discussed in U.S. Pat. No. 2,825,721. Typically, these support materials are inorganic oxides of silica, alumina, silica-alumina mixtures, thoria, zirconia and comparable oxides which are porous, have a medium surface area; and have surface hydroxyl groups. Preferred support materials are silica xerogels or xerogels containing silica as the major constituent. Especially preferred are the silica xerogels described in U.S. Pat. No. 3,652,214 which silica xerogels have a surface area in the range of 200 to 500 m²/g, a pore volume greater than about 2.0 cc/g, a major portion of the pore volume being provided by pores having diameters in the range of 300 to 600 Å.

The chromium containing compounds useful in the present invention comprise the organophosphoryl chromium compounds disclosed in U.S. Pat. No. 3,985,676 (incorporated herein by reference) which comprise the reaction product of chromium trioxide with an organophosphorus compound having the formula:

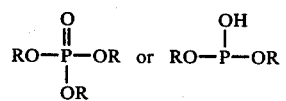

wherein R is alkyl, aralkyl, aryl, cycloalkyl or hydrogen, but at least one R is other than hydrogen. The preferred organophosphorus compounds are trialkyl phosphates such as triethyl phosphate.

Aluminum compounds useful in the present invention are characterized as any aluminum compound capable of reacting with the surface hydroxyl groups of the inorganic support material. Preferred aluminum compounds may be represented by the formula:

$$Al(X)_a(Y)_b(Z)_c$$

wherein X is R, Y is OR, and Z is H or a halogen; a is 0–3, b is 0–3, c is 0–3, and a+b+c equals 3; and R is an alkyl or aryl group having from one to eight carbon atoms.

Examples of such aluminum compounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide, etc.; alkyl aluminum compounds such as triethyl aluminum; triisobutyl aluminum, etc.; alkyl or aryl aluminum halides such as diethyl aluminum chloride; aryl aluminum compounds such as triphenyl aluminum, aryloxy aluminum compounds such as aluminum phenoxide and mixed aryl, alkyl and aryloxy, alkyl aluminum compounds.

The novel catalysts of the present invention may be prepared by depositing the organophosphoryl chromium product and the aluminum compound on the inorganic support in any suitable manner such as by vapor coating or by impregnating the support with solutions thereof in a suitable inert solvent which is normally an anhydrous organic solvent. Such organic solvents include aliphatic, cycloalkyl, and alkylaryl hydrocarbons and their halogenated derivatives. A preferred organic solvent is dichloromethane. The chromium containing-product may be applied to the support first or the aluminum compound may be applied first or the chromium and aluminum compound may be applied together. In applicants' usual method of catalyst preparation, the support is impregnated first with the chromium-containing product and then the aluminum compound.

Preferably the organoaluminum compound may be applied to the catalyst support under conditions similar to those utilized for deposition of the organophosphoryl chromium compound.

The most effective catalysts have been found to be those containing the chromium in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts outside of these ranges can be used to prepare operable catalysts.

After the chromium containing product and the aluminum compound have been deposited on the inorganic support, the support is heated in a non-reducing atmosphere, preferably in an oxygen containing atmosphere, at a temperature above about 300° C. up to the decomposition temperature of the support. Typically, the supported compositions are heated at a temperature of from 500° to 1000° C. The heating time may vary, for example, depending on the temperatures used, from ½ hour or less to 50 hours or more. Normally the heating is carried out over a period of 2 to 12 hours. The non-reducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2–3 ppm of water.

The heat-treated supported chromium and aluminum materials of the present invention may be used directly as an olefin polymerization catalyst i.e., in the absence of a reducing agent as shown in the Examples. Such catalysts may also of course be employed in combination with metallic and/or non-metallic reducing agents as disclosed and claimed in U.S. Pat. No. 3,984,351.

The catalyst compositions of this invention are amenable to use with conventional polymerization processes for olefins, in particular 1-olefins having 2–8 carbon atoms and are suitable for polymerization effected under temperature and pressure conditions generally employed in the art, e.g., temperatures of from about 40° C. to about 200° C. and preferably from about 70° C. to 110° C. and pressures of from 200 to 1000 psig and preferably from 300 to 800 psig, as are used in slurry or particle form polymerizations.

EXAMPLE 1

I. CATALYST PREPARATION PROCEDURE

A. Polypor silica xerogel having a pore volume of about 2.5 cc/g prepared in accordance with the disclosure in U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A dichloromethane solution of the reaction product of $CrO_3$ and triethyl phosphate prepared as described in U.S. Pat. No. 3,985,676 is then added to the flask in sufficient quantity to provide a dry coated catalyst containing about 1% by weight of Cr. The supernatant liquid is removed by filtration and the coated gel is dried in a rotary evaporator at 60° C. and with 29 inches of Hg vacuum.

B. Dichloromethane is added to a similar flask as used in step A and while maintaining a nitrogen atmosphere stirring is commenced. To the flask is added the supported chromium composition prepared in step A above. A solution of dichloromethane and aluminum sec-butoxide is prepared in a pressure equalizing dropping funnel and the funnel attached to the stirred flask. The aluminum sec-butoxide solution is gradually added to the flask at the rate of 10 grams of solution per minute. After the addition of the solution is complete the slurry in the flask is stirred for about 1 hour. The supernatant liquid is removed by filtration and the coated gel is dried in a rotary evaporator at temperatures up to about 60° C. and 29 inches Hg vacuum. The amount of aluminum compound added depends on the % aluminum desired for the production of olefin polymers having specific properties necessary for certain end use applications.

C. To heat activate the catalyst composition prepared in step B, the supported catalyst is placed in a cylindrical container and fluidized with dry air at 0.20 feet per minute lineal velocity while being heated to a temperature of 900° C. and held at this temperature for six hours. The activated supported catalyst is recovered as a powder.

II. POLYMERIZATION

The polymerizations were carried out in a stirred autoclave using isobutane as a diluent. The supported organophosphoryl chromium reaction product and aluminum compound is added along with the isobutane solvent to a stirred one gallon autocalve. The contents of the stirred autoclave are then heated to the polymerization temperature, i.e., 88° to 108° C. Hydrogen, if used, is added and then the ethylene is added to give 10 mol% in the liquid phase at which time the total pressure will be from about 425 to 455 psig. Polymerization begins almost immediately as noted by the ethylene coming from the ethylene demand supply to the reactor. After approximately one hour of polymerization, the reaction is terminated by dropping the reactor contents into a pressure let-down system. The melt index (M.I.) and the high load melt index (HLMI) of the polymers prepared were determined using ASTM D-1238-65T (conditions E and F respectively)

III. A series of polymerizations were carried out comparing catalysts with and without the aluminum compound present. The catalysts were prepared as in the Catalyst Preparation Procedure above, except that the aluminum compound of step B was omitted where indicated. The polymerizations were carried out at about 99° C. and hydrogen was added to the reactor as indicated. No reducing agent catalyst component was employed.

TABLE I

| Al % Wt./SiO$_2$ | H$_2$ (psi) | Productivity (gm PE/gm cat./hr.) | MI | HLMI |
|---|---|---|---|---|
| None | 0 | 622 | 0.26 | 27.8 |
| 3.7 | 0 | 1032 | 0.71 | 53.6 |
| None | 30 | 190 | 0.58 | 43.9 |
| 3.7 | 30 | 1399 | 0.75 | 58.2 |

EXAMPLE 2

Catalysts prepared with and without the aluminum compound were compared in the following olefin polymerizations. The catalysts were prepared identically (except for the omission of the aluminum compound, as indicated) utilizing a spray coating technique substantially in accord with the Catalyst Preparation Procedure above except that minimum solvent is employed, about equivalent to one pore volume of solvent for the silica gel (2.2–2.4 cc/g.).

In these polymerizations (carried out in accordance with the procedure outlined in Example 1) no hydrogen was employed, and no reducing agent. The results were obtained as follows:

TABLE II

| Al % Wt./SiO$_2$ | Productivity (gm Pe/gm cat./hr.) | MI | HLMI | HLMI/MI |
|---|---|---|---|---|
| 3.7 | 552 | 2.96 | 162 | 54.7 |

TABLE II-continued

| Al % Wt./SiO$_2$ | Productivity (gm Pe/gm cat./hr.) | MI | HLMI | HLMI/MI |
|---|---|---|---|---|
| None | 390 | 1.11 | 66 | 59.5 |

What is claimed is:

1. A process for the polymerization of 1-olefins comprising providing at least one 1-olefin to an enclosed polymerization zone maintained at elevated temperature and pressure and comprising an olefin polymerization catalyst system consisting essentially of:
   (a) a solid inorganic support material having surface hydroxyl groups,
   (b) an organophosphoryl chromium reaction product of chromium trioxide and a phosphorus compound having the formula:

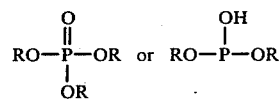

wherein R is alkyl, aralkyl, aryl, cycloalkyl or hydrogen, but at least one R is other than hydrogen, said reaction product being deposited on said support
   (c) an aluminum compound deposited on said support, said aluminum compound being capable of reacting with said surface hydroxyl groups, said supported chromium containing compound and aluminum compound having been heated in a nonreducing atmosphere at a temperature above 300° C. up to the decomposition temperature of the support material.

2. The process of claim 1 wherein the aluminum compound is represented by the formula:

$$Al(X)_a(Y)_b(Z)_c$$

wherein X is R, Y is OR and Z is H or halogen; a is 0–3, b is 0–3, c is 0–3, and a+b+c=3; and R is an alkyl or aryl group having from one to eight carbon atoms.

3. The process of claim 1 wherein the inorganic support material is a silica gel having a surface area of 200 to 500 m$^2$/g, a pore volume above 2.0 cc/g, a major portion of the pore volume being provided by pores having diameters of 300 to 600 Å.

4. The process of claim 1 wherein the chromium containing compound is present in an amount sufficient to provide about 0.25 to about 2.5% by weight of Cr based upon the weight of the support and the aluminum compound is present in an amount sufficient to provide about 0.10 to about 10% by weight of Al based upon the weight of the support.

5. The process of claim 1 wherein the chromium containing compound is the reaction product of chromium trioxide and triethyl phosphate.

6. The process of claim 1 wherein the chromium containing compound is the reaction product of chromium trioxide and triethyl phosphate and the aluminum compound is aluminum sec-butoxide.

7. The process of claim 1 wherein the polymerization temperature ranges from about 40° to about 200° C. and the polymerization pressure ranges from about 200 to about 1000 psig.

* * * * *